United States Patent [19]
Epperson

[11] Patent Number: 6,095,021
[45] Date of Patent: Aug. 1, 2000

[54] ELECTRICALLY POWERED HAND HELD PIPE CUTTER

[76] Inventor: Kenneth Epperson, 1614 Sherwin, Las Vegas, Nev. 89115

[21] Appl. No.: 09/299,347

[22] Filed: Apr. 26, 1999

[51] Int. Cl.[7] ................................................. B23B 3/22
[52] U.S. Cl. .............................. 82/70.2; 82/99.1; 82/113; 82/128; 82/130
[58] Field of Search ................................ 82/70.2, 83, 84, 82/92, 99.1, 101, 113, 123, 130, 131, 128

[56] References Cited

U.S. PATENT DOCUMENTS

| | | | |
|---|---|---|---|
| 3,379,080 | 4/1968 | Massa | 82/128 X |
| 4,770,074 | 9/1988 | Kwech | 82/113 |
| 4,939,964 | 7/1990 | Ricci | 82/113 |
| 5,054,342 | 10/1991 | Swiatowy et al. | 82/113 |
| 5,549,024 | 8/1996 | Ricci | 82/101 X |

*Primary Examiner*—Henry W. H. Tsai
*Attorney, Agent, or Firm*—Leonard Weiss

[57] ABSTRACT

A hub assembly includes a sector gear with teeth that extend over a segment of a gear circle. The sector gear has a lip along an interior circle within the gear circle and concentric therewith. The sector gear is bracketed by a pair of sector plates that have the general shape of a portion of a hollow cylinder. The lip and the plates are substantially a portion of a hollow cylinder with an inside that is a boundary of the interior of the hub assembly. A spring urges a pair of rotatable bearings into contact with a pipe that is within the hub assembly. A spring urges the blade into contact with the pipe the pipe. A motor causes a rotation of the hub assembly about the pipe, thereby cutting the pipe.

10 Claims, 3 Drawing Sheets

ELECTRICALLY POWERED HAND HELD PIPE CUTTER

BACKGROUND OF THE INVENTION

1. Field of Invention

This invention is in the general field of cutting tools and, more particularly, is a battery powered hand held pipe cutter.

2. Description of the Prior Art

A hand held pipe cutter is typically in the general shape of a C-clamp with an interior lip that forms an arcuate cradle for a pipe. At the bottom of the cradle are a plurality of roller bearings.

The cutter includes a blade on the end of a screw that passes through a threaded hole through the body of the cutter with threads of the screw engaging threads in the hole. The screw is rotated to advance the blade towards the cradle.

When a pipe is cradled within the cutter, a central axis of the pipe is perpendicular to the screw. Moreover, the blade and the cradle are substantially diametrically opposite each other. Therefore, pressure of the blade upon the pipe presses the pipe against the bearings.

Because of the bearings, the hand held pipe cutter is manually rotatable about the pipe, thereby causing the blade to cut the pipe. A disadvantage of the hand held pipe cutter is that the rotation about the pipe is a task that is physically enervating.

There are pipe cutters that are electrically powered. However, electrically powered pipe cutters are undesireably large. Heretofore, there has not been a hand held pipe cutter that is electrically powered.

SUMMARY OF THE INVENTION

An object of the present invention is to provide a hand held pipe cutter that is electrically powered.

According to the present invention, a hub assembly includes a sector gear with teeth that extend over a segment of a gear circle and a lip along an interior circle within the gear circle. The interior circle is concentric with the gear circle. The sector gear is bracketed by a pair of sector plates. The lip and interior surfaces of the plates substantially form a portion of a hollow cylinder having an inside surface which is a boundary of the interior of the hub assembly. A spring urges two or more rotatable bearings into contact with a pipe positioned within the interior of the hub assembly. A spring urges a blade into contact with the pipe. A motor rotates gears that engage the sector gear to rotate the hub assembly about the pipe.

The invention provides a hand held pipe cutter that is operated without physically exhausting an operator.

Other objects, features, and advantages of the invention should be apparent from the following description of the preferred embodiment thereof as illustrated in the accompanying drawing.

DESCRIPTION OF THE PREFERRED EMBODIMENT

Figure 1:
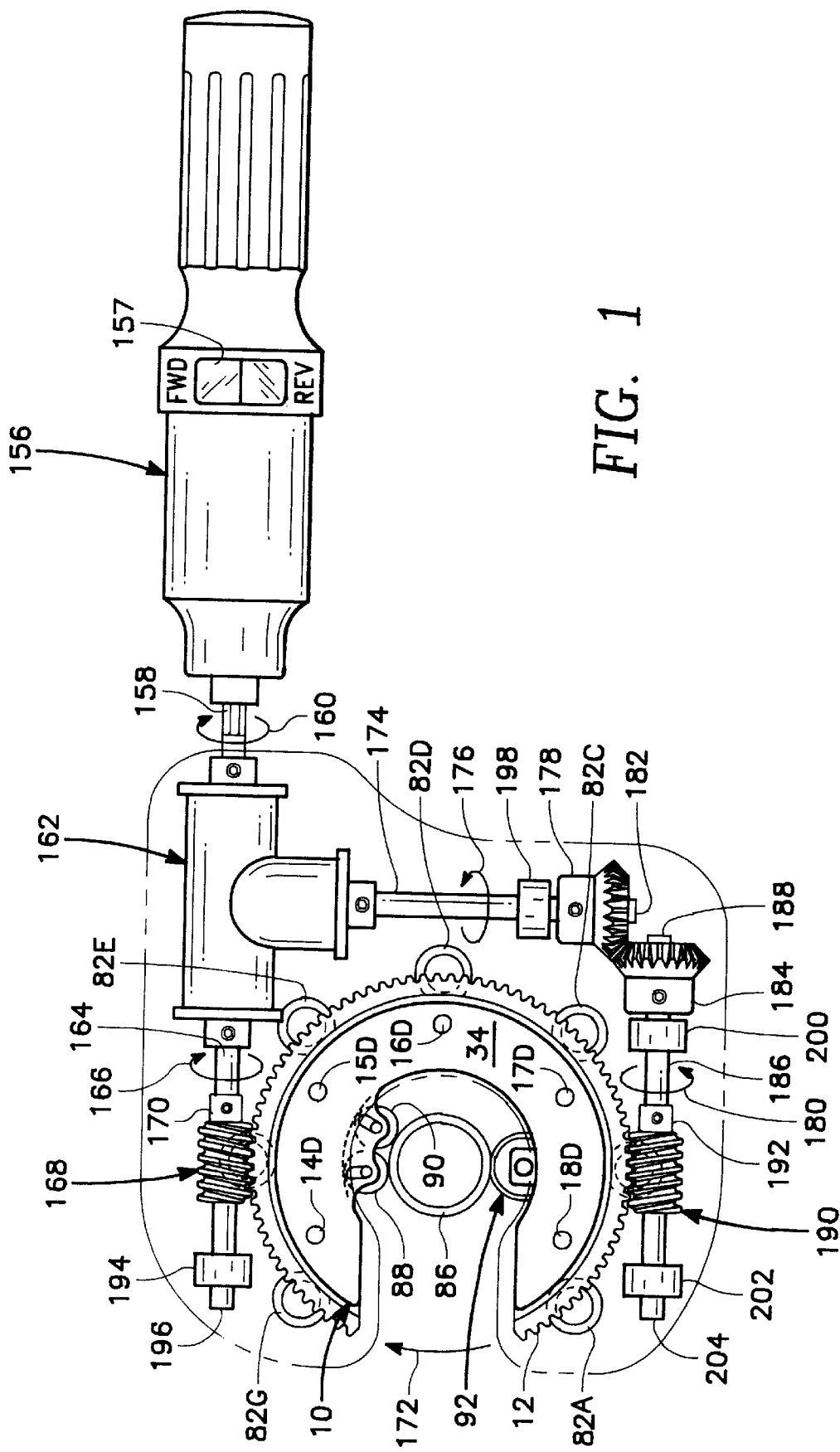
FIG. 1 is a plan view of the preferred embodiment of the present invention.
Figure 2:
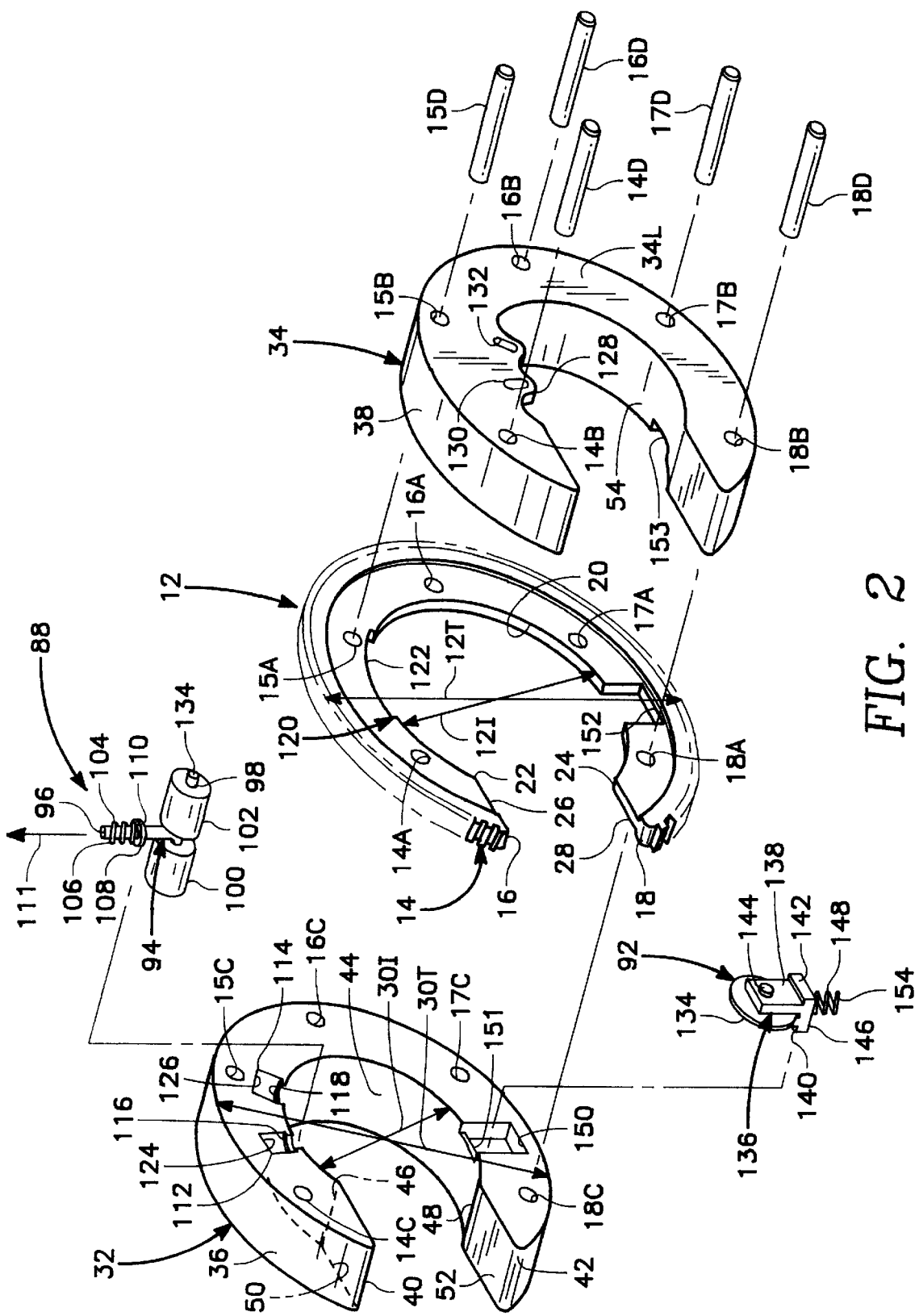
FIG. 2 is an exploded perspective view of a hub assembly in the embodiment of FIG. 1.

As shown in FIGS. 1 and 2, an electrically powered pipe cutter has a hub assembly 10 (FIG. 1) that includes a sector gear 12 with evenly spaced holes 14A–18A therethrough. The gear 12 has teeth that extend over a segment 14 of a gear circle that has a diameter 12T (FIG. 2).

The segment 14 has ends 16, 18. In this embodiment, the segment 14 is two hundred eighty degrees of the gear circle. As explained hereinafter, an essential feature of the invention is that the segment 14 exceeds one hundred eighty degrees of the gear circle.

The gear 12 has a lip 20 with ends 22, 24. The lip 20 is along a segment of an interior circle, concentric with the gear circle, having a diameter 12I. A sector edge 26 of the gear 12 extends between the ends 16, 22. Similarly, a sector edge 28 of the gear 12 extends between the ends 18, 24. The edge 26 is parallel to the edge 28.

The hub assembly 10 additionally includes similar sector plates 32, 34 with outer bearing surfaces 36, 38, respectively. The plate 32 is substantially a portion of a cylinder having an inside diameter 30I and an outside diameter 30T. The diameter 30I substantially equals the diameter 12I. The diameter 30T is less than the diameter 12T. The plates 34, 32 have evenly spaced holes 14B–18B and 14C–18C therethrough, respectively The bearing surface 36 has ends 40, 42. An interior surface 44 of the plate 32 has ends 46, 48. A sector end surface 50 extends between the ends 40, 46. Similarly, a sector end surface 52 extends between the ends 42, 48.

The surface 50 is parallel to the surface 52 with a distance therebetween substantially equal to the distance between the edges 26, 28. The plate 34 has sector end surfaces similar to the surfaces 50, 52.

Forced bit drive screws 14D–18D pass through the holes 14B, 14A, 14C, the holes 15B, 15A, 15C, the holes 16B, 16A, 16C, the holes 17B, 17A, 17C and the holes 18B, 18A, 18C, respectively, whereby the gear 12 is maintained between the plates 32, 34. Moreover, the surfaces 50, 52 are maintained in a contiguous relationship with the edges 26, 28, respectively. Additionally, the surface 44 is maintained in a contiguous relationship with the lip 20. Similar relationships exist between sector end surfaces of the plate 34, an interior surface 54 of the plate 34, the edges 26, 28 and the lip 20. The surfaces 44, 54 and the lip 20 substantially form an inner surface of a portion of a hollow cylinder that is a boundary of the interior of the hub assembly 10.

Figure 3:
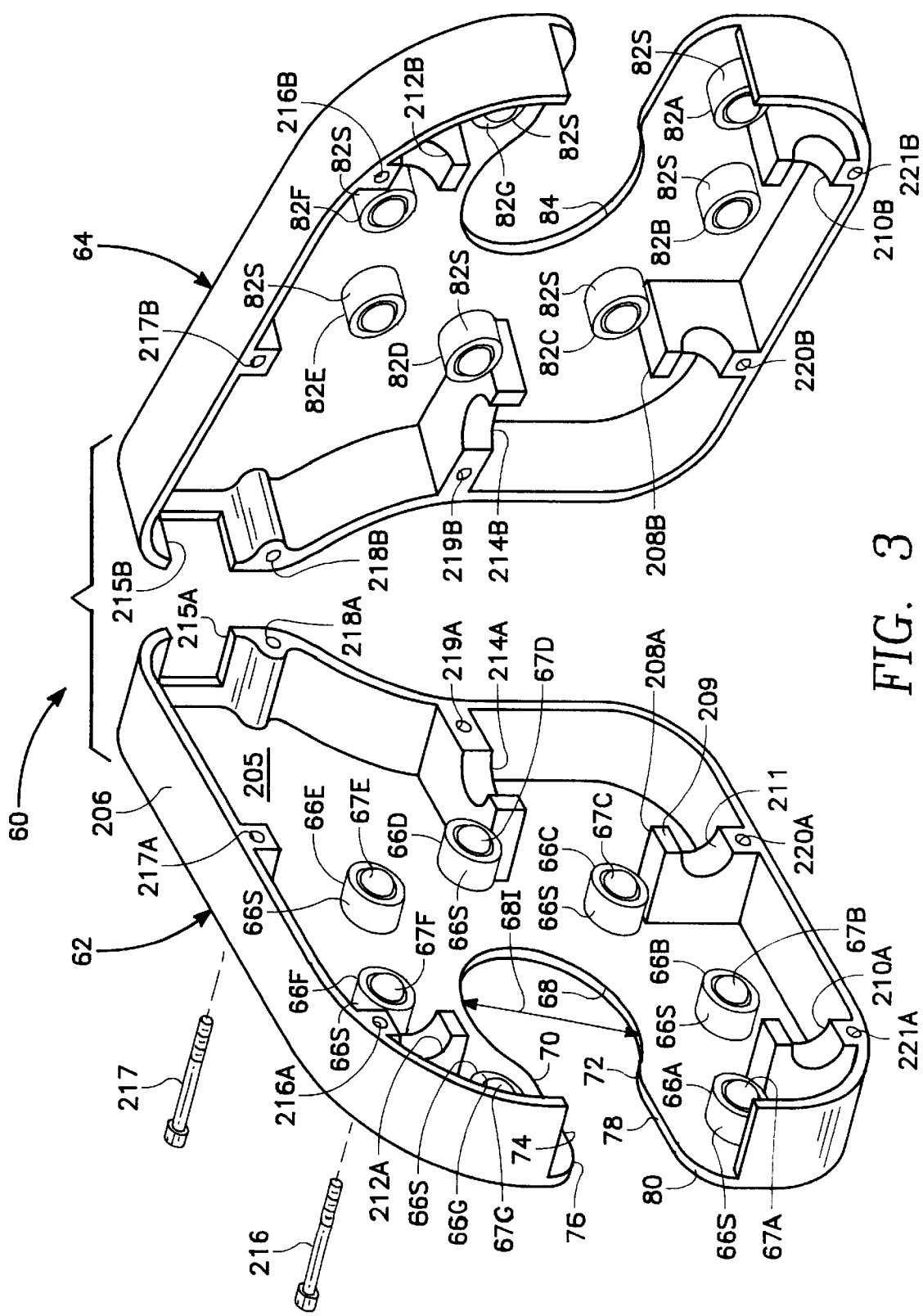
FIG. 3 is a partially exploded perspective view of a housing in the embodiment of FIG. 1.

As shown in FIG. 3, a housing 60 includes similar sections 62, 64. Pin bearings 66A–66G have bearing surfaces 66S. The bearings 66A–66G are connected to the section 62 by mounting screws 67A–67G, respectively, about an opening 68 in the section 62.

The opening 68 has a circular portion with a diameter 68I and ends 70, 72. The diameter 68I substantially equals the diameter 30I.

An entry edge 74 extends from the end 70 to an end 76 of the opening 68. Additionally, an entry edge 78 extends from the end 72 to an end 80 of the opening 68. The edges 74, 78 are parallel to each other and have a distance therebetween substantially equal to the distance between the edges 26, 28. An entry portion of the opening 68 is bounded by the edges 74, 78.

In a similar manner, the section 64 is connected to pin bearings 82A–82G that are similar to the bearings 66A–66G. The bearings 82A–82G have cylindrical bearing surfaces 82S.

The bearings 82A–82G are disposed about an opening 84 in the section 64. The opening 84 is similar to the opening 68.

The hub assembly 10 fits in the housing 60 with the surface 36 in contact with the surfaces 66S and the surface 38 in contact with the surfaces 82S. Because of the bearings 66A–66G, 82A–82G, the hub assembly 10 is axially rotatable while being maintained against translation.

The hub assembly 10 is rotatable to an entry position, whereby the edges 74, 78 are proximal to the surfaces 50, 52, respectively. Similarly, edges that define an entry portion of the opening 84 are proximal to sector end surfaces of the plate 34. In other words, the hub assembly 10 is rotatable to permit positioning of a work piece, such as a pipe 86 (FIG. 1), within the hub assembly 10. The pipe 86 is maintained within the hub assembly 10 by similar bearing assemblies 88, 90 and a knife assembly 92.

The bearing assembly 88 (FIG. 2) includes a T shaped frame 94 with a cylindrical rod 96, which is a vertical member of the T. One end of the rod 96 is integrally connected to an approximate center of a rod 98, which is a horizontal member of the T.

A substantial portion of one half of the rod 98 is within a hollow cylindrical bearing 100. A substantial portion of the other half of the rod 98 is within a hollow cylindrical bearing 102. The bearings 100, 102 are similar to each other.

The rod 96 is within a coil spring 104. Moreover, an end 106 of the spring 104 is fixedly connected to the rod 96 in any suitable manner.

The rod 106 passes through a washer 108 whereby the washer is on the rod 106. The washer 108 is fixedly connected to an end 110 of the spring 104. Hence, when the rod 94 is moved in the direction of an arrow 111 while the washer 108 is stationary, the spring the spring 104 is in tension.

Mounting holes for the bearing assemblies 88, 90 are formed by notches 112, 114 in the plate 32. The notches 112, 114 are in the general shape of one half of a countersunk hole with countersink ledges 116, 118, respectively. Notches (not shown), similar to the notches 112, 114 are in the plate 34.

The gear 12 has a notch 120 therein. When the hub assembly 10 is formed, a bottom 122 of the notch 120 is contiguous with bottoms 124, 126 of the notches 112, 114, respectively. Additionally, the notch 112, and a notch corresponding notch 112 in the plate 34, form a hole wherein the spring 104 and the rod 96 are inserted.

When the spring 104 and the rod 96 are inserted, the washer 108 rests upon the ledge 116 and a ledge of the notch corresponding to the notch 112 in the plate 34. In a similar manner, the notch 114 and a notch, corresponding to the notch 114 in the plate 34, form a hole used in connection with the bearing assembly 90.

A bearing support member 128 is integrally connected to the plate 34. The member 128 extends from the surface 54. One side of the member 128 is integral with a surface 34L of the plate 34. Slotted holes 130, 132 pass through the member 128. The plate 32 has a bearing support member (not shown) that is similar to the member 128.

When the hub assembly 10 is formed, one end 134 of the rod 98 is within the hole 130. The other end of the rod 98 (not shown) is within a corresponding slotted hole of the support member of the plate 32.

Because the hole 130 and the hole corresponding thereto are slotted, the bearings 100, 102 are moveable towards the bottom 124 while the washer 108 remains on the ledge 116, thereby causing tension in the spring 104. It should be understood that when the pipe 86 is within the hub assembly 10, the bearings 100, 102 contact the pipe 86. Moreover, the bearings 100, 102 are moved by the pipe 86 towards the bottom 84, thereby causing tension in the spring 104 to urge the bearings 100, 102 towards the pipe 86.

In a similar manner tension in a spring urges bearings of the assembly 90 towards the pipe 86. The bearing assembly 90 is not shown in FIG. 2 for reasons of clarity.

The knife assembly 92 includes a circular blade 134 mounted within a U shaped frame 136. The blade 134 has a central hole therethrough (not shown).

The frame 136 has parallel arms 138, 140 that are connected to a base 142 with the arms 138,140 perpendicular to the base 142. The blade 134 is sandwiched between the arms 138, 140. Additionally, a shaft 144 passes through the hole through the blade 134 and holes through and arms 138, 140. It should be understood that the shaft 144 is fixedly connected to the arms 138, 140 and the blade 134 is fixedly connected to the shaft 144. The base 142 has an underside 146 fixedly connected to one end of a coil spring 148.

A mounting hole for the knife assembly 92 is formed by a rectangular notch 150 in the plate 32, a notch 152 in the gear 12 and a notch 153 in the plate 134 that is similar to the notch 150. When the hub assembly 10 is formed, the notch 152 is contiguous with the notches 150, 153, thereby forming a rectangular mounting hole. The knife assembly 92 is placed to partially extend from the rectangular mounting hole with an end 154 of the spring 148 in contact with the bottom of the rectangular mounting hole.

The notch 150 has a retention ledge 151 proximal to the surface 44. The retention ledge 151 and a similar ledge of the notch 153 maintain the base 142 within the rectangular mounting hole in the absence of a pipe within the hub assembly 10.

When the pipe 86 is within the hub assembly 10, it contacts the blade 134, thereby compressing the spring 148. When the spring 148 is compressed, the blade 134 is urged towards the pipe 86. Since the blade 134, the bearings 100, 102 and the bearings of the bearing assembly 90 are in contact with the pipe 86 and urged towards the pipe 86, all that is needed is rotation of the hub assembly 10 to circumferentially cut the pipe 86.

Power to rotate the hub assembly 10 is provided by a hand held motor 156 (FIG. 1) that is that is controlled by a switch 157. The motor 156 is operable to cause rotation of a shaft 158 at an input angular velocity in a direction of an arrow 160 and in a direction opposite therefrom. The shaft 158 is coupled to a power transmission gear system 162. Power transmission systems are well known to those skilled in the art.

Rotation of the shaft 158 at an input angular velocity in the direction of the arrow 160 causes a drive shaft 164 of the transmission 162 to rotate in a direction of an arrow 166 at an output angular velocity. The output angular velocity is less than the input angular velocity thereby causing torque available at the shaft 164 to exceed torque available at the shaft 158.

A worm gear 168 is coupled by a coupling collar 170 to the shaft 164, whereby the worm gear 168 rotates at the output angular velocity of the shaft 164. Since the diameter 30T is less than the diameter 12T (FIG. 2), the worm gear 168 can engage the teeth of the gear 12 to provide a torque that causes the hub assembly 10 to rotate in a direction of an arrow 172.

In further response to the rotation of the shaft 158, a translation shaft 174 of the transmission 162 rotates in a direction of an arrow 176 at the output angular velocity of the shaft 164. Thus, torque available at the shaft 174 substantially equals the torque available at the shaft 164. A bevel gear 178 is fixedly mounted on the shaft 174 proximal to an end 182 thereof.

A bevel gear 184 fixedly mounted upon a translated drive shaft 186 proximal to an end 188 thereof. Teeth of the bevel gear 178 engage teeth of the bevel gear 184. The gears 178, 184 are similar to each other.

Because the gears 178, 184 are similar, the shaft 186 rotates in the direction of an arrow 180 at the output angular velocity of the shaft 164. Thus, torque available at the shaft 186 substantially equals the torque available at the shaft 164.

The shafts 186, 174 are perpendicularly disposed. The perpendicular disposition of the shafts 184, 174 results from the use of the beveled gears 178, 184.

A worm gear 190 is coupled by a coupling collar 192 to the shaft 186 whereby the worm gear 190 rotates at the output angular velocity of the shaft 164. When teeth of the gear 12 engage the worm gear 190, a torque is provided by the worm gear 190 that causes the hub assembly 10 to rotate in a direction of the arrow 172.

The worm gears 168, 190 are at opposite ends of a diameter of the gear circle referred to hereinbefore. Since the segment 14 exceeds one hundred eighty degrees of the gear circle, a torque is applied to the gear 12 by either the worm gear 168, the worm gear 190 or simultaneously by the worm gears 168, 190.

A hollow cylindrical bearing 194 is mounted on the shaft 164 proximal to an end 196 thereof. A hollow cylindrical bearing 198, similar to the bearing 194, is mounted on the shaft 174 proximal to the gear 178. As explained hereinafter, the bearings 194, 198 are seated within bearing seats that prevent a flexure of the shafts 164, 174.

A hollow cylindrical bearing 200 is mounted on the shaft 186 proximal to the gear 184. A hollow cylindrical bearing 202 is mounted on the shaft 186 proximal to an end 204 thereof. As explained hereinafter, the bearings 200, 202 are seated within bearing seats that prevent a translation of the shaft 186.

The section 62 (FIG. 3) has a bottom wall 205 and a side wall 206. A drive shaft bearing seat includes a block 208A with one surface integrally connected to the wall 205 and another surface integrally connected to the wall 206. A top surface 209 of the block 208A has an arcuate portion 211. The section 64 has block 208B that is similar to the block 208A. When the sections 62, 64 are connected together as described hereinafter, the blocks 208A, 208B form the drive shaft bearing seat wherein the bearing 200 is seated.

The section 62 has blocks 210A, 212A, 214A integrally connected thereto that are similar to the block 208A. Correspondingly, the section 64 has blocks 210B, 212B, 214B integrally connected thereto that are similar to the block 208A. When the sections 62, 64 are connected together, the blocks 210A, 210B, the blocks 212A, 212B and the blocks 214A, 214B form bearing seats for the bearings 202, 194, 198, respectively.

The wall 206 has a rectangular notch 215A, The section 64 has a notch 215B similar to the notch 215A. When the sections 62, 64 are connected together, the notches 215A, 215B form an entry port for the shaft 158.

The section 62 has holes 216A–221A therethrough. Correspondingly, the section 64 has holes 216B–221B therethrough. Bolts 216 passes through the holes 216A, 216B and the holes 217A, 217B, respectively, to connect the sections 62, 64. A nut is screwed onto the bolt 216 and the bolt 217 to secure the connection of the sections 62, 64. In a similar manner, the connection of the sections 62, 64 is reinforced by bolts (not shown) that pass through the holes 217A, 217B, the holes 218A, 218B, the holes 219A, 219B, the holes 220A, 220B and the holes 221A, 221B.

I claim:
1. A pipe cutter comprising:
   a sector gear that has teeth that extend over a segment of a gear circle and a lip along a segment of an interior circle that is concentric with said gear circle;
   a pair of sector plates that are each substantially a portion of a hollow cylinder, said plates being connected to bracket said gear to form a hub assembly, said lip and said plates substantially forming a portion of a hollow cylinder having an inside surface that is a boundary of the interior of said hub assembly;
   two or more rotatable bearings connected to said hub assembly;
   means for urging said rotatable bearings into contact with a pipe within said hub assembly;
   a blade connected to said hub assembly;
   means for urging said blade into contact with said pipe; and
   means for rotating said hub assembly about said pipe.

2. The pipe cutter of claim 1 wherein said means for urging said rotatable bearings is a spring.

3. The pipe cutter of claim 1 wherein said means for urging said blade is a spring.

4. The pipe cutter of claim 1, additionally comprising bearing means for causing at least one of said plates to be axially rotatable while being maintained against translation.

5. The pipe cutter of claim 4 wherein the outside surface of said plates is a bearing surface, said bearing means comprising:
   a housing having a section with an opening therein, a circular portion thereof having a diameter substantially equal to an inside diameter of said plates; and
   a plurality of pin bearings connected to said housing section, said pin bearings being disposed about said circular portion of said opening, at least one of said plates fitting onto said housing section with its bearing surface in contact with said pin bearings.

6. The pipe cutter of claim 5 wherein said sector gear has first and second parallel sector edges extend from from first and second ends of said segment to first and second ends of said lip, respectively, that are parallel and said plates each have a pair of end surfaces that are parallel with the distance between a pair of plates substantially equal to the distance between said segment edges, said plates bracketing said sector gear with each of said endsurfaces in a contigous relationship with a sector edge, said opening in said housing having an entry portion bounded by two entry edges that are parallel to each other with a distance therebetween substantially equal to the distance between said sector edges, said hub assembly being rotatable to an entry position where said entry edges are proximal to said end surfaces.

7. The pipe cutter of claim 1, said means for rotating comprising:
   a motor:
      means connected to said motor for applying torque to said hub assembly.

8. The pipe cutter of claim 7, said means for applying torque comprising:
   a power transmission system connected to a shaft of said motor, said transmission system having a drive shaft and a translation shaft that are perpendicular to each other, said shafts rotating at equal angular velocities in response to a rotation of said motor shaft;

a worm gear connected to said drive shaft that engages teeth of said sector gear at one end of a diameter of said gear circle; and gear means for applying a torque to said hub assembly at the other end of said diameter.

9. The pipe cutter of claim 8 wherein said segment exceeds one hundred eighty degrees of said gear circle.

10. The pipe cutter of claim 9, said gear means comprising:

a first bevel gear connected to said translation shaft;

a second bevel gear having teeth that engage teeth of said first bevel gear;

a translated drive shaft whereon said second bevel gear is mounted, said translation shaft and said translated drive shaft being perpendicularly disposed; and a worm gear mounted on said translated drive shaft that engages teeth of said sector gear.

* * * * *